Aug. 11, 1953 A. CRESSWELL 2,648,496
CENTRIFUGAL APPARATUS FOR SEPARATING GASES FROM LIQUIDS
Filed Dec. 3, 1946 3 Sheets-Sheet 1

INVENTOR
ARTHUR CRESSWELL
BY
Sidney M. Hones
AGENT

Aug. 11, 1953 A. CRESSWELL 2,648,496
CENTRIFUGAL APPARATUS FOR SEPARATING GASES FROM LIQUIDS
Filed Dec. 3, 1946 3 Sheets-Sheet 2

INVENTOR
ARTHUR CRESSWELL,
BY
Sidney M. Hones
AGENT

Aug. 11, 1953   A. CRESSWELL   2,648,496
CENTRIFUGAL APPARATUS FOR SEPARATING GASES FROM LIQUIDS
Filed Dec. 3, 1946   3 Sheets-Sheet 3
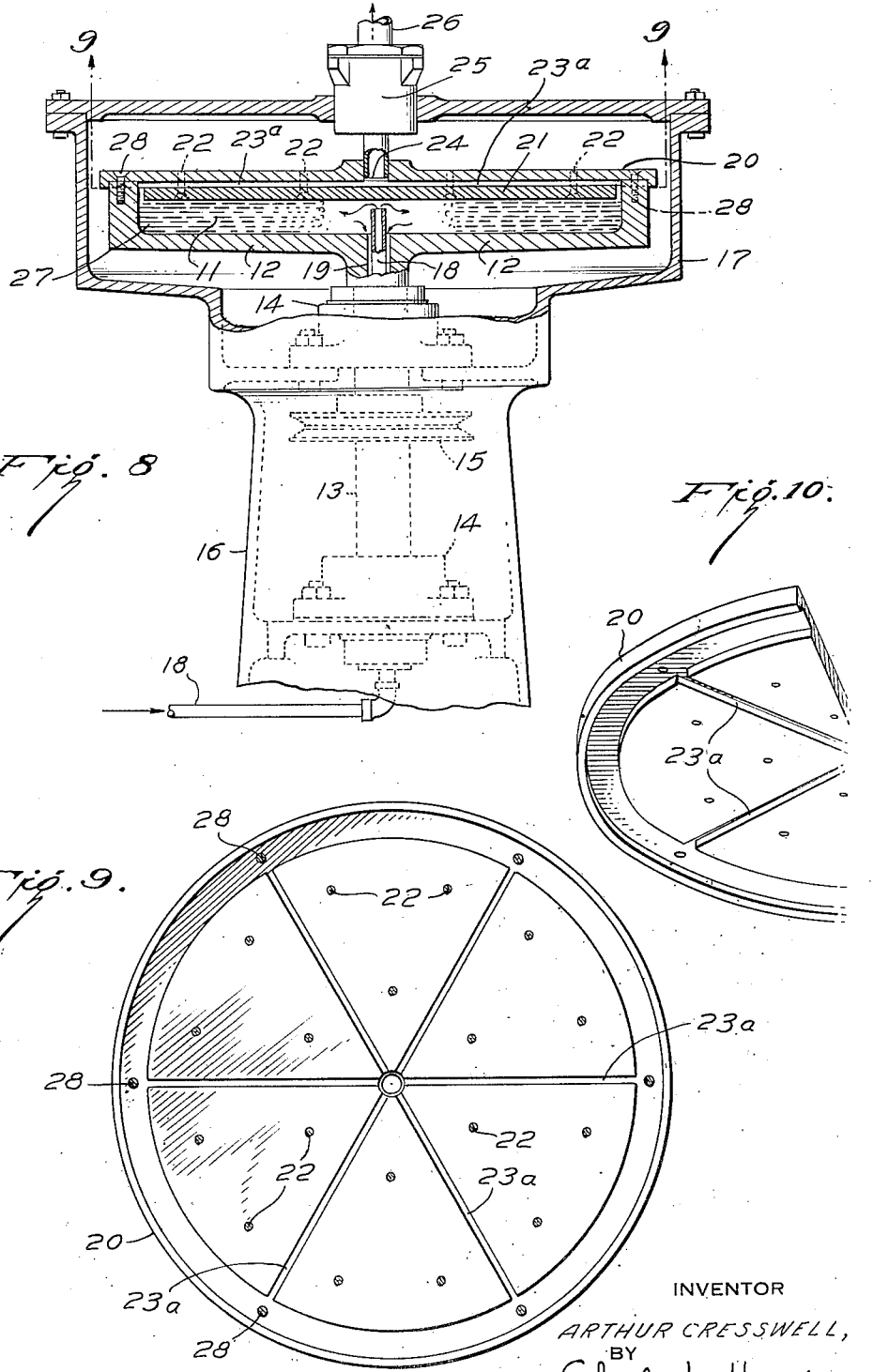
INVENTOR
ARTHUR CRESSWELL,
BY
Charles L. Harness
ATTORNEY Patented Aug. 11, 1953

2,648,496

UNITED STATES PATENT OFFICE 2,648,496

CENTRIFUGAL APPARATUS FOR SEPARATING GASES FROM LIQUIDS

Arthur Cresswell, Stamford, Conn., assignor to American Cyanamid Company, New York, N. Y., a corporation of Maine Application December 3, 1946, Serial No. 713,687

1 Claim. (Cl. 233—22)

The present invention relates to apparatus and methods for degassing liquids, and more particularly to those employing centrifugal force.

Heretofore, the conventional means available for degassing liquids have not been particularly adapted to the removal of gases from those liquids which are viscous, have a tendency to foam, are heat sensitive or otherwise difficult to degas. In addition, none of such conventional procedures are adapted for use in conjunction with a continuous process wherein it is generally required that large amounts of liquid or solution be degassed rapidly and in a continuous manner. Examples of operations wherein liquids or solutions must be degassed rapidly and continuously are to be found in the spinning of synthetic or artificial fibers, filaments, threads and the like. In such spinning operations, the presence of air bubbles in the liquid or solution to be spun results in such bubbles coming through the orifices of the spinnerette and breaking the individual filaments extruded from the particular orifices. If the proportion of such breakage is sufficiently large the result can be the disruption of the entire spinning operation of the particular spinnerette.

An object of this invention is to provide suitable apparatus and methods for degassing liquids which are viscous, have a tendency to foam, are heat sensitive, or for other reasons are difficult to degas.

Another object of this invention is to provide apparatus and methods whereby liquids or solutions may be degassed rapidly, in large volume, and in a continuous manner.

Another object of this invention is to provide apparatus and methods whereby centrifugal force may be employed in degassing such liquids or solutions.

These and other objects of this invention will become more apparent upon consideration of the following description of some preferred embodiments thereof, particularly when taken in connection with the attached drawing, in which:

Fig. 8 is a vertical view partly in section of a centrifugal separator embodying this invention;

Fig. 9 is a sectional view taken along the line 9—9 of Fig. 8 and looking in the direction of the arrows; and Fig. 10 is a partial perspective view of the protective casing shown in Figs. 8 and 9 and showing some of the radial channels whereby the degassed liquid is removed from the rotor in one embodiment of the invention.

Figures 1, 2, 3:
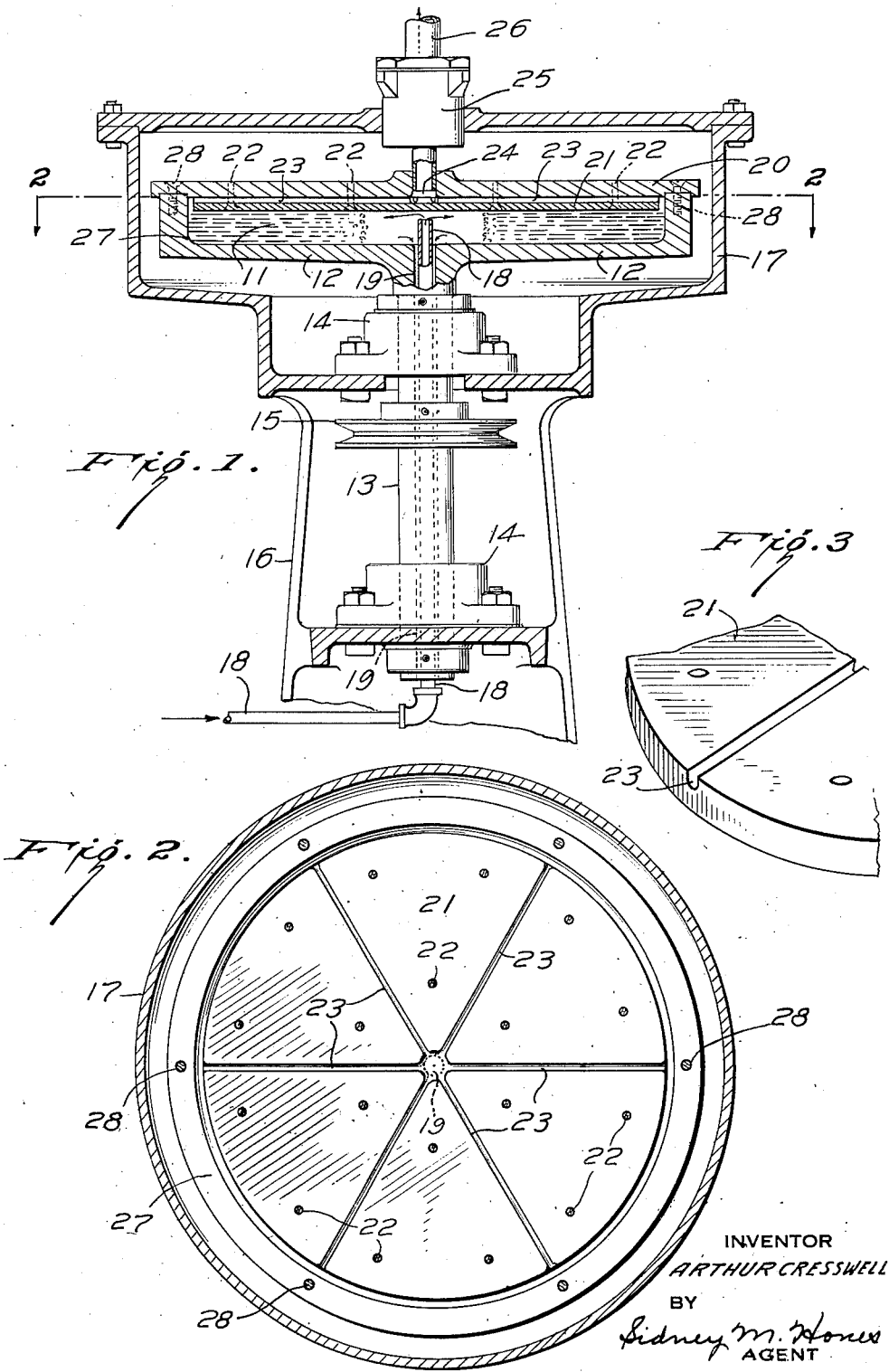
Figure 1 is a vertical view partly in section of a centrifugal separator embodying this invention.
Fig. 2 is a sectional view taken along the line 2—2 of Fig. 1 and looking in the direction of the arrows.
Fig. 3 is a partial perspective view of the top plate shown in Figs. 1 and 2 showing one of the radial channels whereby the degassed liquid is removed from the rotor.

In the embodiment shown in Figs. 1–3, the hollow rotor 11 is mounted axially on one side 12 on the hollow shaft 13, said shaft being supported by thrust bearings 14 and driven by drive sheave 15 by means of a belt connected to a suitable motor, neither of which are shown. The entire apparatus is supported on standard 16 while the rotor is enclosed by a protective casing 17. Within said hollow shaft is liquid feed line 18, said line having an outer diameter smaller than the inner diameter of said hollow shaft thus forming annular channel 19. Said liquid feed line preferably extends into the hollow portion of said rotor. In combination with the other disc side 20 is plate 21 connected thereto by screws 22 and containing radial channels 23 communicating with the periphery of the hollow portion of said rotor and an axially located discharge port 24. Said discharge port is connected by rotary joint 25 with stationary line 26 connected with a reservoir (not shown). Disc side 20 is connected to the annular side 27 of rotor by screws 28.

Of course, the radial conduits shown at 23 may be formed in disc side 20 by drilling or grooving the same therein or said conduits may be grooved in the plate 21, as shown at 23A in Figs. 9 and 10 or otherwise formed.

Figure 4:
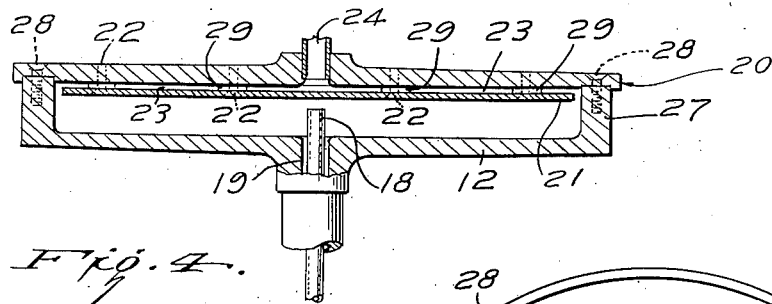
Fig. 4 is a fragmentary vertical view partly in section of another centrifugal separator embodying this invention.
Figure 5:
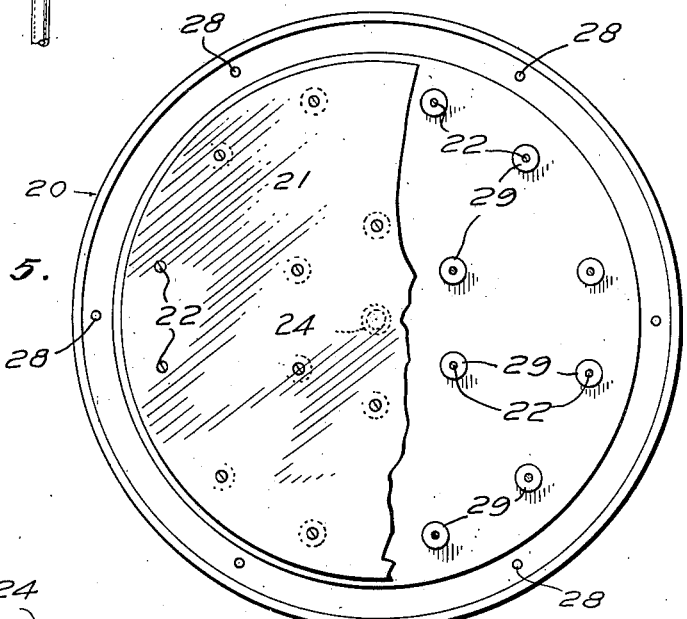
Fig. 5 is a face view of the underside of the plate and top assembly of Fig. 4 with the plate partly broken away.

In the modification shown in Figs. 4 and 5 the conduit means 23 are formed by the plate 21 and the disc side 20, said plate being connected thereto by screws 22 in combination with spacing rings 29. This embodiment provides conduit means of maximum size in addition to being of simpler design and more easily fabricated.

Figure 6:
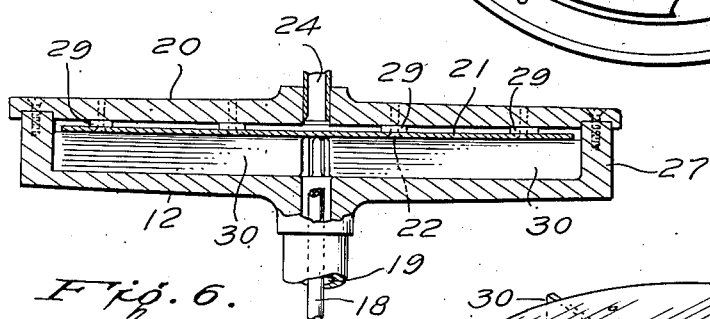
Fig. 6 is a fragmentary vertical view partly in section of an additional embodiment of the centrifugal separator of this invention.
Figure 7:
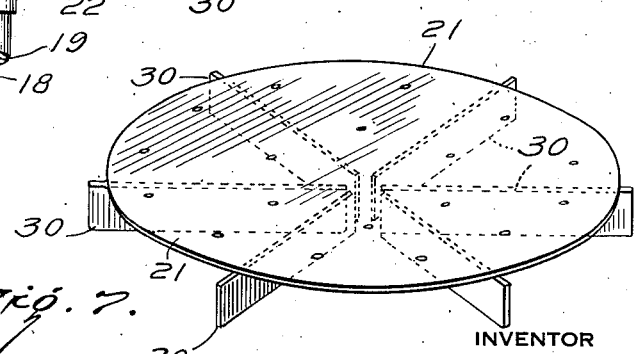
Fig. 7 is a view in perspective of the plate used in the embodiment shown in Fig. 6.

The modification shown in Figs. 6 and 7 differs from that shown in Figs. 4 and 5 mainly in that radial dividers 30 for segmenting the interior of the rotor, i. e., the degassing compartment, are attached to the plate 21. The segmenting of the degassing compartment within said rotor helps to insure the maintenance of a balance in operating the apparatus, particularly on starting up or shutting down said operation.

In the operation of the apparatus, more particularly the embodiment shown in Figs. 1–3, the liquid to be degassed is pumped through the feed line 18 impinging upon plate 21 at the center thereof. The rotor being revolved at a high speed by means of a drive sheave 15, said liquid is thrown to the outer region of said rotor by virtue of the resultant centrifugal force. Said rotor may be driven at any desired speed depending on the liquid degassed and the rate at which said degassing should be effected, a speed of the order of 1000 R. P. M. having been found satisfactory in degassing aqueous collagen solutions containing 5–15% collagen although higher speeds may be employed if desired. The gas removed by virtue of such centrifugal action escapes by passing through the annular channel 19. The degassed liquid gradually works to the outer peripheral region of the degassing compartment and through the conduit means 23 to the liquid discharge port 24 wherefrom it is removed through the stationary line 26 which is connected with said discharge port by rotary joint 25. The said stationary line is connected to a reservoir (not shown). In order to effect removal of the degassed liquid it is necessary to exert a differential pressure on the liquid leg which is within the degassing compartment. This may best be done by drawing a vacuum on the liquid leg which is within the conduit means, and preferably by maintaining the aforementioned reservoir under vacuum.

The apparatus of the present invention is particularly useful in connection with degassing such viscous solutions as, for example, aqueous solutions of collagen and other proteins. Since many of the liquids employed in spinning artificial or synthetic fibers are exceedingly viscous, and since they must be degassed in order to minimize interruption of the spinning operation, the apparatus of the present invention is employed to particular advantage in connection with the spinning of such viscous liquids to form fibers. Many artificial fibers are not sufficiently fine for this consideration to be of any great importance. On the other hand, in a newly developed process for the production of surgical suture threads by spinning aqueous collagen solutions filaments of exceedingly small diameter are spun, so that degassing the collagen solutions to eliminate interruption of the spinning operation because of bubbles coming through the small orifices of the spinnerette is of great importance. What is more, the apparatus of the present invention may be employed in conjunction with such spinning processes, whereas no other degassing apparatus or techniques are known by which the large amounts of liquid required in such spinning operations can be degassed, and in the continuous manner.

While the present invention has been described hereinabove and shown in the attached drawings in terms of certain specific modifications or embodiments, it is not to be held as restricted thereby but should be construed and interpreted solely in accordance with the appended claim.

What is claimed is:

A centrifugal device for continuously degassing liquids comprising a hollow shaft mounted for axial rotation, a hollow rotor mounted on the said shaft, said rotor having upstanding walls closed by a cover, a radial plate of less diameter than the inside diameter of the hollow rotor, said plate being secured to and closely spaced from the rotor cover to form a degassed liquid conduit therebetween, a stationary hollow inlet pipe for liquid to be degassed, concentric with, mounted within and spaced from the hollow shaft thus forming a gas take-off therebetween, the outlet of the inlet pipe being in proximity to the bottom of the plate, means to rotate the device about the stationary inlet pipe, means to feed liquid to be degassed through the inlet pipe and against the bottom of the plate, vacuum means for withdrawing degassed liquid from the hollow rotor in an axial direction and means to withdraw gas from the degassed liquid from between the hollow shaft and the inlet pipe.

ARTHUR CRESSWELL.

References Cited in the file of this patent

UNITED STATES PATENTS

| Number | Name | Date |
| --- | --- | --- |
| 1,004,760 | Fetzer | Oct. 3, 1911 |
| 1,101,548 | Hoffman | June 30, 1914 |
| 1,123,867 | Gue | Jan. 5, 1915 |
| 2,222,727 | Stigen | Nov. 26, 1940 |

FOREIGN PATENTS

| Number | Country | Date |
| --- | --- | --- |
| 374,281 | France | Apr. 13, 1907 |
| 25,761 | Great Britain | of 1909 |
| 373,560 | Great Britain | May 26, 1932 |
| 610,305 | Germany | Mar. 9, 1935 |